Jan. 20, 1959  I. L. KLUGMAN  2,869,292
PRECISION GRINDING MACHINE
Filed May 29, 1957  2 Sheets-Sheet 1

INVENTOR.
Ira Louis Klugman
BY
ATTORNEY

Jan. 20, 1959

I. L. KLUGMAN 2,869,292

PRECISION GRINDING MACHINE

Filed May 29, 1957

INVENTOR.
Ira Louis Klugman
BY
ATTORNEY.

United States Patent Office 2,869,292
Patented Jan. 20, 1959

2,869,292

PRECISION GRINDING MACHINE

Ira Louis Klugman, Kansas City, Mo.

Application May 29, 1957, Serial No. 662,478

5 Claims. (Cl. 51—122)

This invention relates generally to the field of equipment for use in machining metal parts and, more particularly, to an improved machine for grinding plane surfaces on large workpieces.

Heretofore, the approach of the art to the problem of grinding large workpieces such as engine blocks, for example, has been to attempt to arrange means for shifting a grinding tool relative to the heavy workpiece while the latter is held stationary. Such conventional concept has given rise not only to unduly complex and expensive types of equipment but, even more seriously, has given rise to types of apparatus which are capable only of operating upon one or a very few particular types of workpiece and which, even as to these, is capable of attaining only limited accuracy in the grinding operation performed.

Accordingly, it is the primary object of this invention to provide an improved machine for grinding large workpieces of various sizes and natures and with extreme accuracy, wherein the vertical axis of rotation of a rotary grinder is maintained stationary and provision is made for reciprocating the heavy workpiece horizontally beneath a rotary grinding tool whose position may be raised or lowered along said vertical axis.

Another important object of the invention is to provide such a machine in which means are included for moving the grinding tool, its spindle and drive motor as a unit upwardly and downwardly in an accurately vertical path, with mechanism being provided for both coarse and fine adjustment or positioning along such path without disturbing the true vertical positioning of the spindle shaft upon which the rotary grinding tool is carried.

Another important object of the invention is to provide such a machine wherein reciprocation of the workpiece relative to the grinding tool may be accomplished at a uniform rate by power means provided for such purpose.

Another important object of the invention is to provide power means for operating the mechanism for raising and lowering the grinding tool, its spindle and prime mover rapidly but accurately to a desired position from which final adjustment may be made by manually controlled, fine positioning means.

Another important object of the invention is to provide such a machine of greatly increased simplicity, which not only lowers the initial manufacturing cost to a small fraction of that of prior apparatuses intended for the same general purpose, but also effects surprising improvements in operating speed and convenience, the amount of maintenance required and the accuracy of the machining operation performed.

Still other important objects of the invention, including certain details of construction, will be made clear or become apparent as the following description of the invention progresses.

In the accompanying drawings:

Fig. 5 is a fragmentary, cross-sectional view taken on line V—V of Fig. 2;

Fig. 6 is an enlarged, fragmentary, cross-sectional view of a portion of the bed and a portion of the carriage showing the means of reciprocably mounting the latter on the former; and Fig. 7 is a cross-sectional view similar to Fig. 6 but taken along a line spaced longitudinally from the view of Fig. 6 and showing another important detail of the structure reciprocably mounting the carriage on the bed.

Figure 1:
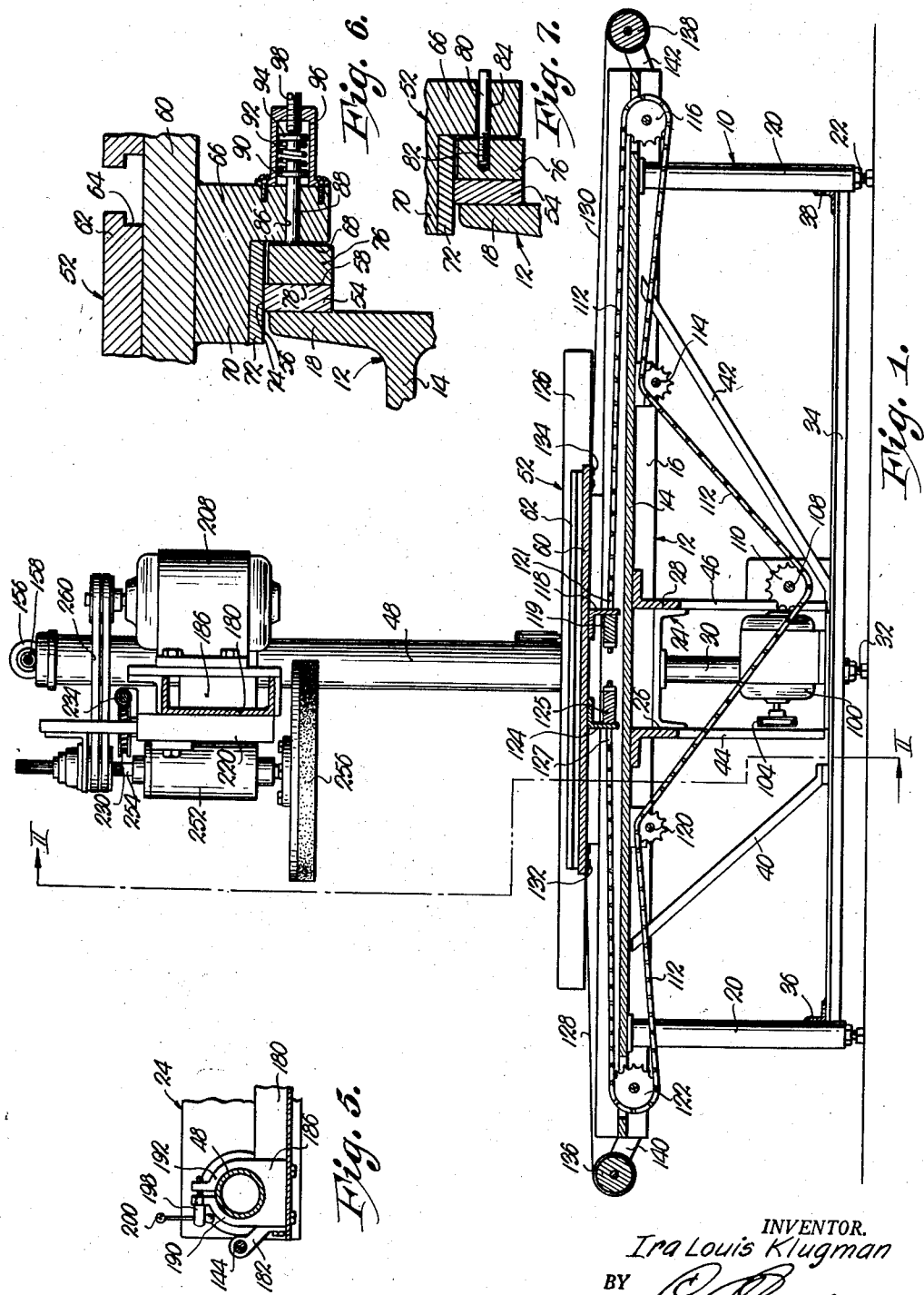
Figure 1 is a cross-sectional view of one embodiment of machine made in accordance with the invention taken on a line extending longitudinally through the machine.
Figures 2, 3, 4:
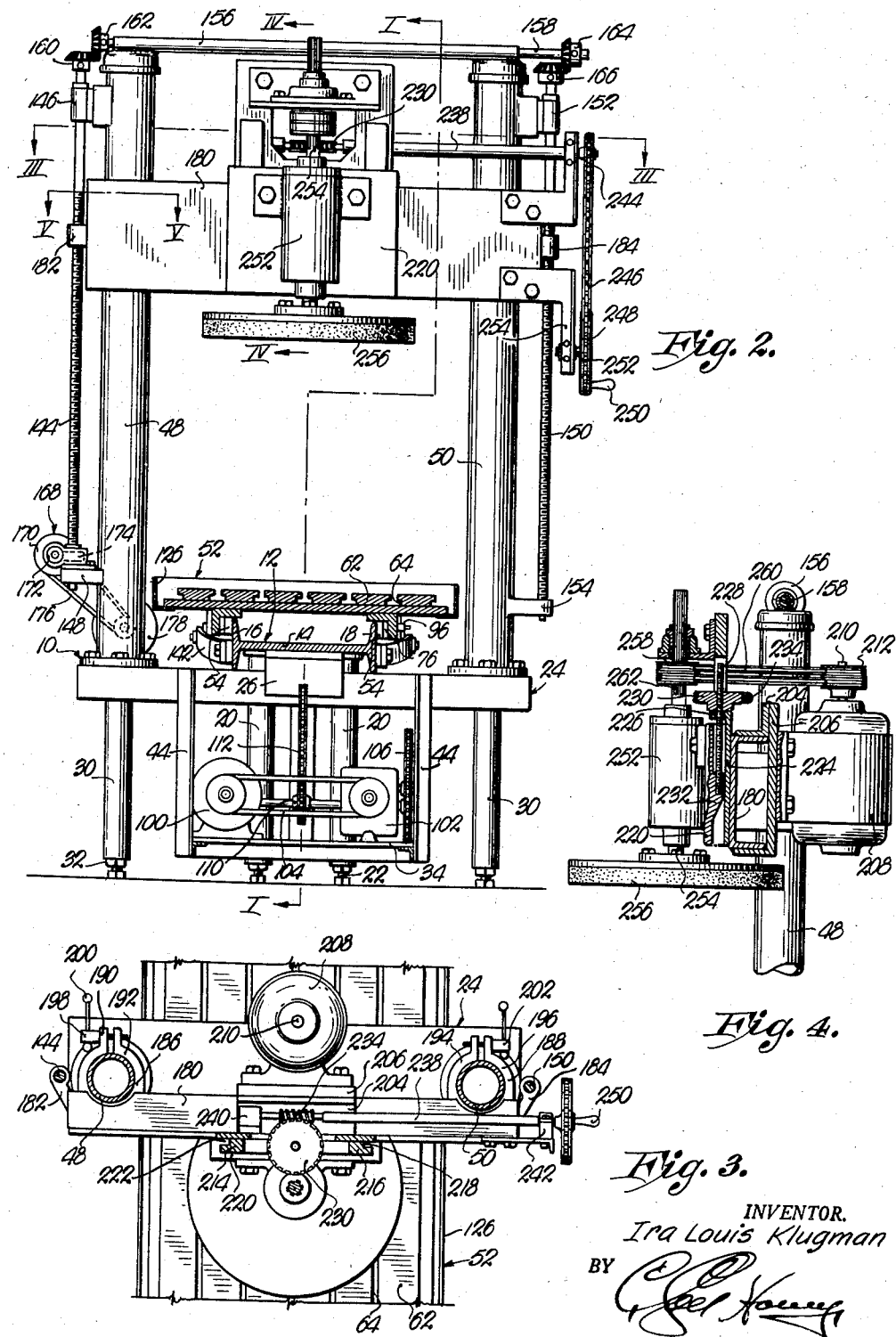
Fig. 2 is a transverse cross-sectional view of the machine taken on line II—II of Fig. 1.
Fig. 3 is a fragmentary, cross-sectional view taken on line III—III of Fig. 2 and looking downwardly.
Fig. 4 is a fragmentary, cross-sectional view taken on line IV—IV of Fig. 2.

Referring now to the accompanying drawings, particularly Figs. 1 and 2, the numeral 10 generally designates a base structure for the machine. Base structure 10 broadly includes an elongated, generally horizontal bed 12 in the form of a heavy, relatively broad I-beam provided with a horizontal portion 14 and a pair of end flange portions 16 and 18; four vertical legs 20 supporting the corners of the horizontal portion 14 of bed 12 and each preferably provided with conventional leveling mechanism as at 22; an intermediate cross-support 24 underlying bed 12 and extending laterally therefrom in both directions substantially midway between the ends of the bed 12, the flange portions 16 and 18 resting atop the support 24 which is rigidly secured to the horizontal portion 14 of bed 12 by means of brackets 26 and 28; a pair of opposed, intermediate, supporting legs 30 respectively underlying the portions of support 24 extending laterally on either side from beneath the bed 12 and each preferably provided with suitable leveling means 32; an elongated horizontal shelf 34 underlying the bed 12 and supported through attachment by brackets 36 and 38 to the legs 20, braces 40 and 42 depending from the bed 12 and braces 44 and 46 depending from the support 24; and a pair of spaced, elongated, vertical posts 48 and 50 standing in opposed relationship to each other atop the support 24 intermediate the ends and on opposite sides of the bed 12, posts 48 and 50 being secured to support 24 in any suitable rigid manner for maintaining the same in their disposition of spaced vertical parallelism. Upon what has been generally referred to as the base structure 10 referred to above, the various other elements and working parts of the machine are mounted and disposed as hereinafter described.

It should be observed that, although certain details of construction of the base structure 10 might conceivably be altered without adverse effect, very strong and stable base structure is required for supporting the heavy workpieces for movement as contemplated by the invention, and the base structure 10 described has been found to be the currently preferred arrangement capable of providing such strength and rigidity at an economical cost.

Referring now also to Figs. 6 and 7, an elongated, work-supporting carriage is generally designated 52 and mounted for horizontal reciprocation upon the bed 12 along the longitudinal axis of the latter in the manner hereinafter to be described. Secured to each of the flange portions 16 and 18 of the bed 12 is an elongated, bearing rail 54 of rectangular cross-section having a vertical surface 56 and an outwardly facing surface 58, the rails 54 being so secured to the bed 12 in any suitable manner, as by welding or the like, that the elongated upper surfaces 56 thereof are horizontal and at the same level and the outermost surfaces 58 are disposed vertically and substantially parallel. It may also be noted that the rails 54 are so disposed upon the bed 12 that upper surfaces 56 lie in a plane somewhat above the uppermost extremity of the corresponding flange portions 16 and 18. The rails 54 are preferably formed of good grade machine steel.

The carriage 52 includes a horizontal plate 60 having workpiece supporting ribs 62 thereon, the ribs 52 having undercut grooves 64 therebetween to permit fastening of a workpiece to the carriage 52 in the conventional manner. Carriage 52 also is provided with a pair of elongated, spaced, parallel, side pieces 66 depending therefrom and arranged at a spacing somewhat greater than the spacing between the outer surfaces 58 of the rails 54, insofar as the innermost surfaces 68 thereof are concerned. Each of the pieces 66 also includes, however, an inwardly extending portion 70, which extends over the uppermost surface 56 of the corresponding rail 54, it being observed that the pieces 66 are preferably formed with an L-shaped cross-section, as illustrated. Underlying the inwardly extending portion 70 of each piece 66 is a rider block 72 having a lowermost, horizontal, bearing surface 74 adapted to ride upon the upper surface 56 of the corresponding rail 54, the blocks 72 being preferably formed of bronze or other suitable bearing material. The block 72 may be mounted upon the upper side of the portions 70 of the pieces 66 in any suitable manner such as by welding or brazing, as illustrated for convenience, or by means of recessed screws or the like. Between the portion of each piece 66 opposite the outermost surface 58 of a corresponding rail 54 is disposed an elongated rider block 76 of rectangular cross-section having an innermost, vertical surface 78 in sliding engagement with the outer bearing surface 58 of the corresponding rail 54. Each block 76 has a plurality of elongated, outwardly extending, horizontal pins 80 threaded thereinto as at 82 at intervals spaced longitudinally therealong. Such pins 80 extend through and are slidably received by aligned horizontal bores 84 provided in the corresponding piece 66. Pins 80 thus serve to maintain the blocks 58 between the pieces 66 and the corresponding rails 54.

It will be noted that the bearing blocks 76 are shiftably mounted relative to the pieces 66 and are biased toward the outer surfaces 58 of the corresponding rails 54 by means hereinafter described, in order to allow for any wear upon the surfaces 78 and 58 or any lack of parallelism of the latter to assure that the path of travel of the carriage 52 relative to the bed 12 will remain substantially linear. Between the bores 84, the pieces 66 are provided with a number of other bores 86 each slidably receiving a horizontal pin 88 having its innermost end in engagement with the corresponding block 76. Pins 88 are provided with outturned flanges 90 outwardly of the piece 66 against which bears one end of a coiled compression spring 92 having its opposite end bearing against a follower 94. The outer end and flange 90 of each pin 88, together with the corresponding spring 92 and follower 94 are housed within the interior of a housing 96 mounted upon the piece 66 and provided with a threadably mounted adjusting screw 98 bearing against the outermost extremity of the follower 94 for adjustment of the tensioning of spring 92 as the screw 98 is shifted relative to the housing 96. By adjustment of the screws 98 the required inward bias upon each of the pins 88 may be obtained for maintaining the blocks 76 stably but slidably engaged with the corresponding rails 54. This structure has been found to be ideally adapted for compensating for such wear as may occur. It may be noted, however, that should it become necessary either the bronze blocks 72 or the bronze blocks 76 may be easily replaced.

To provide for power reciprocation of the carriage 52 in either direction along the length of the bed 12, and particularly between the upstanding posts 48 and 50, there is provided on the shelf 34 a reversible electric motor 100 coupled with a gear reduction box 102 by a pulley 104, the gear box 102 being in turn coupled by a chain 106 with a lateral shaft 108 having a drive sprocket 110 thereon. Drive sprocket 110 engages an elongated chain 112 extending therefrom in one direction around an idler sprocket 114 mounted on the underside of bed 12, and a second idler sprocket 116 at one end of the bed 12, thence back to a point of connection with a bracket 118 on the carriage 52 beneath the plate 60 thereof; the chain 112 similarly extends in the opposite direction around an idler pulley 120 on the underside of the bed and another idler pulley 122 at the opposite end of the bed 12, thence back to a point of connection with a bracket 124 on the underside of plate 60 of carriage 52. Thus, upon control of the electrical circuits (not shown) associated with the carriage driving motor 100, the latter may be caused to operate in either direction to move the chain 112 and thereby positively reciprocate the carriage 52 along bed 12. Reversal of direction of the reciprocation of carriage 52 is accomplished through control of the motor 100 by means of such electrical circuits. It may be noted that the connections of chain 112 with brackets 118 and 124 are spring loaded by the provision of springs 119 and 125 respectively, the ends of chain 112 being attached to rods 121 and 127 extending through brackets 118 and 124 and springs 119 and 125. Springs 119 and 125 serve to absorb any shock on starting or reversing the movement of carriage 52.

In order to prevent accumulation of particles of metal or other foreign matter upon the bed 12, the carriage 52 is provided with an upstanding pan-like tray 126 around its periphery and with opposed rolls of canvas 128 and 130 fastened to the underside of the plate 60 of carriage 52 as at 132 and 134 respectively from which such strips of canvas 128 and 130 extend to and are rolled upon rollers 136 and 138 respectively provided on the corresponding ends of the bed 12. Such rollers 136 and 138 are rotatably mounted upon brackets 140 and 142 respectively and are in the nature of rotatably biased take-up rollers similar to enlarged curtain rods. Thus, the rollers 136 and 138 maintain the canvas strips 128 and 130 taut regardless of the reciprocated position of the carriage 52. Foreign material collecting upon the tray 126 and strips 128 and 130 may be periodically removed without damage to the bed 12, the bearing means reciprocably mounting carriage 52 or the motor 100 and associated structure.

Referring now particularly to Fig. 2, it will be seen that there is an elongated, vertical screw 144 rotatably mounted on the outer side of post 48 by means of an upper bracket 146 and a lower bracket 148. A second elongated screw 150 is similarly mounted on the outer side of post 50 by means of an upper bracket 152 and a lower bracket 154, the screws 144 and 150 being carefully maintained in vertical, parallel relationship. Mounted upon and extending between the tops of posts 48 and 50 is a bearing tube 156 in which a horizontal shaft 158 is rotatably mounted. The upper end of screw 144 is provided with a pinion 160 meshing with a pinion 162 on one end of the horizontal shaft 158, there being a pinion 164 on the opposite end of shaft 158 meshing with a pinion 166 on the uppermost end of screw 150. Thus, screws 144 and 150 are operably coupled for simultaneous rotation at the same rate of speed whenever either of same is rotated. Mounted upon bracket 148 is an assembly generally designated 168 including a pulley 170 coupled with a worm 172 meshing with a worm gear 174 keyed to the screw 144. Pulley 170 is coupled by a belt 176 with a reversible electric motor 178 provided for driving the pulley 170 to rotate the screw 144 by means of the worm 172 and worm gear 174. The direction of rotation of the screw 144, and therefore the screw 150 coupled therewith, is determined by manual control of electrical operating circuits (not shown) coupled with the driving motor 178.

An elongated, horizontal cross member 180 of generally U-shaped cross-section is mounted for vertical reciprocation by means of an internally threaded attachment 182 thereon threadably received upon screw 144 and a similar attachment 184 at the opposite end of member 180 threadably received upon screw 150. It will be apparent that when the motor 178 is operated to rotate screws 144 and 150, the vertical position of the member 180 will shift as the attachments progress upwardly or downwardly upon the screws 144 and 150. Since the screws 144 and 150 are threaded in like fashion and are rotated at the same speed, it will be apparent that the horizontal positioning of the longitudinal axis of member 180 is maintained regardless of the position of vertical reciprocation of the member 180 relative to the screws 144 and 150 and the carriage 52 and bed 12 therebeneath. Mounted upon and extending laterally from the member 180 (see Figs. 3 and 5) are bifurcated clamping elements 186 and 188, the former including a pair of opposed legs 190 and 192 embracing post 48, while the latter includes a pair of opposed legs 194 and 196 embracing post 50. In their normal condition, the legs 190 and 192 of clamping element 186 are spaced apart sufficiently to either clear or only loosely engage the post 48 so as not to interfere with reciprocation of the member 180 relative to the latter, the legs 194 and 196 of clamping element 188 being similarly arranged with respect to the post 50. Element 186 is provided, however, with a rotatable screw 198 provided with a manipulating handle 200 adapted for use in drawing the legs 190 and 192 together to tightly clamp the element 186 upon the post 48 for holding the member 180 rigidly relative thereto. The clamping element 188 is provided with a similar clamping screw 202. Thus, after coarse positioning of the member 180 to a predetermined vertical level, the screws 198 and 202 may be operated to tightly fasten the member 180 relative to the posts 48 and 50, such screws 198 and 202 being loosened before any subsequent rotation of the screws 144 and 150 for vertical positioning of the member 180.

Intermediate the ends of the member 180 there is mounted thereon by means of a bracket 204 a plate 206, upon which in turn is mounted an electric motor 208 having a shaft 210 provided with a pulley 212 thereon. On the opposite side of member 180 are mounted a pair of spaced, vertical, parallel rail elements 214 and 216 each undercut on its outer side as at 218. Slidably mounted upon rail elements 214 and 216 for vertical sliding movement relative thereto is a spindle-carrying rider 220 having inwardly extending parts 222 received within the undercuts 218 of rails 214 and 216. Between the rails 214 and 216 a bracket 224 on member 180 provides a journal as at 226 for rotatably supporting a vertical adjustment screw 228 having a worm gear 230 keyed thereto above the bracket 224. The lower extremity of screw 228 is threaded into a screw block 232 attached to the spindle-carrying plate 220. Thus, rotation of the fine adjusting or positioning screw 228 threads the same into block 232 of plate 220 a greater or lesser degree, thereby reciprocating the plate 220 vertically relative to the member 180 upon the rails 214 and 216. The means provided for effecting such rotation of screw 228 include a worm 234 meshed with worm gear 230 and disposed on a rotatable shaft 236 carried upon member 180 by bearing means 240 and 242. A sprocket 244 on shaft 238 is coupled by a chain 246 with a lower sprocket 248 having a manipulating crank handle 250 and mounted on a stub shaft 252 rotatably mounted on member 180 by bracket means 254. Accordingly, after coarse positioning of the member 180 has been effected by operation of motor 178 to rotate screws 144 and 150, and after the clamps 186 and 188 have been tightened upon the posts 48 and 50, crank handle 250 may be manipulated to ultimately rotate the fine positioning screw 228 for precise final vertical positioning of the plate 220 relative to the member 180 and bed 12 therebelow.

Rigidly mounted upon the plate 220 is a tool-carrying spindle 252 having a rotatable shaft 254 whose longitudinal axis is disposed vertically. On the lower-most end of the spindle shaft 254 is disposed a grinding tool or wheel 256 of preferably relatively large diameter, the connection of grinding wheel 256 with shaft 254 being rigid for rotation thereof together. An opposite, upper portion of the shaft 254 extending from the upper extremity of spindle 252 has splined thereon a pulley 258, which is coupled with the pulley 212 of motor 208 by means of a belt 260. By virtue of the splining of shaft 254 as at 262, it will be clear that the pulley 258 is free to ride upwardly or downwardly relative to the shaft 254 as the plate 220 and spindle 252 are adjusted relative to the member 180 without disturbing the coupling operation of belt 260 running to the pulley 212 of motor 208 whose position is fixed relative to the member 180. Suitable bearing means for the upper extremity of spindle shaft 254 may be provided, if desired, as particularly illustrated in Fig. 4.

The operation of the machine will now be apparent to those skilled in the art as involving, first, fastening the workpiece to the horizontally reciprocable carriage 52, then operating the motor 178 to effect a coarse vertical positioning of the member 180 and grinding tool 256 carried thereby, then operating the crank handle 250 to effect final positioning of the tool 256 vertically relative to the workpiece upon the carriage 52, and finally, operating the motor 100 to move the workpiece horizontally back and forth below the grinding wheel 256, which is being rotated by the motor 208, to effect the desired grinding operation. Manifestly, after coarse positioning of the member 180 has once been effected and the clamps 186 and 188 tightened, further, fine vertical positioning of the grinding wheel 256 may be accomplished by manipulation of the crank handle 250. Those skilled in the art will appreciate that through a knowledge of the pitch of threads upon screws 144 and 150 and upon the screw 228, very precise and accurate positioning of the grinding tool 256 to predetermined levels relative to the bed 12, carriage 52 and a workpiece upon the latter can be effected, it also being noted that, if desired, revolution counters may be associated with the screws 144 and 150 and the screw 228 to provide a means of indicating the measured height or level of the grinding tool 256 above the carriage 52.

It will now be apparent that the illustrative form of machine described with a view to explaining the principles of the invention is ideally adapted for accomplishing all of the above mentioned and other objects of the invention. It should also be recognized, however, that certain minor modifications and changes could be made without departing from the true spirit or intention of the invention. Accordingly, it will be understood that the invention should be deemed limited only by the scope of the claims that follow.

Having thus described the invention, what is claimed as new and desired to be secured by Letters Patent is:

1. In a machine for precision grinding large workpieces, base structure including a generally horizontal, elongated bed and a pair of spaced, elongated, upright posts adjacent opposite sides of the bed; a workpiece supporting carriage; a pair of elongated, spaced, parallel, horizontal rails on the bed and extending longitudinally thereof between the posts; a pair of elongated, spaced, parallel, opposed, cross sectionally L-shaped elements on the carriage each having a horizontally extending leg portion slidably resting on a corresponding rail, and a vertically depending leg portion extending along the side of a corresponding rail remote from the other rail; an elongated, rail-engaging bar for each element respectively, carried by the latter between the vertically depending leg portion thereof and the corresponding rail and mounted for shifting movement toward and away from said last-mentioned leg portion; a plurality of horizontal bearing plungers for each bar respectively, there being an inwardly extending, horizontal bore for each plunger respectively in the vertically depending portion of the corresponding element, each plunger being reciprocably received in its bore; spring means yieldably biasing each plunger respectively inwardly into bearing engagement with the corresponding bar for maintaining the latter in tight sliding engagement with the side of the corresponding rail; a member spanning the distance between the posts; means mounting the member on the posts for vertical reciprocatory movement longitudinally of the posts; a vertical, tool carrying shaft; means rotatably mounting the shaft on the member; a grinding tool on the lower end of the shaft adapted for engagement with a workpiece on the carriage; a prime mover operably coupled with the shaft for rotating the latter; means mounting the prime mover on the member; structure for shifting the member vertically, and thereby the prime mover, shaft and tool; and structure for controllably reciprocating the carriage.

2. In a machine as set forth in claim 1, wherein means are provided for varying the tensioning on each of said spring means respectively.

3. In a machine as set forth in claim 1, wherein are provided a pair of rollers; means rotatably mounting a roller at each end respectively of the bed, said rollers extending transversely of the bed; means yieldably biasing each of said rollers respectively in a rotational sense; and a pair of flexible sheets, each sheet being oppositely connected to a roller and the corresponding extremity of the carriage in covering relationship to that portion of the bed which would otherwise be exposed beyond the extremities of the carriage, said sheets winding upon and unwinding from the rollers automatically as the carriage is shifted.

4. In a machine as set forth in claim 1, wherein is provided a plate shiftably mounted on the member, and manually operable means for controllably shifting the plate relative to the member, said shaft being mounted on and carried by the plate.

5. In a machine as set forth in claim 4, wherein said plate is vertically reciprocable relative to the member.

References Cited in the file of this patent

UNITED STATES PATENTS

| | | |
|---|---|---|
| 1,327,440 | MacGregor | Jan. 6, 1920 |
| 2,257,480 | Perazzoli | Sept. 30, 1941 |
| 2,367,156 | Thompson | Jan. 9, 1945 |
| 2,582,694 | Gundlach | Jan. 15, 1952 |